United States Patent
Kuronuma

(10) Patent No.: US 11,532,844 B2
(45) Date of Patent: Dec. 20, 2022

(54) VEHICLE BATTERY COOLING SYSTEM

(71) Applicant: SUBARU CORPORATION, Tokyo (JP)

(72) Inventor: Kunihiko Kuronuma, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 229 days.

(21) Appl. No.: 16/745,598

(22) Filed: Jan. 17, 2020

(65) Prior Publication Data
US 2020/0313256 A1 Oct. 1, 2020

(30) Foreign Application Priority Data

Mar. 25, 2019 (JP) .............................. JP2019-056384

(51) Int. Cl.
*B60H 1/00* (2006.01)
*H01M 10/625* (2014.01)
(Continued)

(52) U.S. Cl.
CPC ...... *H01M 10/625* (2015.04); *B60H 1/00278* (2013.01); *B60H 1/00878* (2013.01);
(Continued)

(58) Field of Classification Search
CPC .. H01M 10/625; H01M 10/613; H01M 10/63; H01M 10/486; H01M 2220/20
See application file for complete search history.

(56) References Cited

U.S. PATENT DOCUMENTS 5,937,664 A * 8/1999 Matsuno ............ B60H 1/00278
62/259.2
8,258,726 B2 * 9/2012 Okuda .................... B60L 58/26
318/268

(Continued)

FOREIGN PATENT DOCUMENTS

DE 102014225807 A1 6/2016
JP 10-306722 A 11/1998
(Continued)

OTHER PUBLICATIONS

Japanese Office Action dated Jul. 26, 2022 in Application No. 2019-056384; with English Machine Translation.

*Primary Examiner* — Nael N Babaa
(74) *Attorney, Agent, or Firm* — Troutman Pepper Hamilton Sanders LLP

(57) ABSTRACT

A vehicle battery cooling system includes a battery temperature sensor, a vehicle cabin temperature sensor, a discharge path via which a vehicle cabin, a battery chamber, and outside of a vehicle communicate with each other, a circulation path that circulates air between the vehicle cabin and the battery chamber, a switching unit that switches between the discharge path and the circulation path, and a controller. When a pressurization condition is satisfied, the controller operates the switching unit to select one of the discharge path and the circulation path based on measurement results of the battery temperature sensor and the vehicle cabin temperature sensor. The pressurization condition includes a condition that an air pressure in the vehicle cabin is higher than atmospheric pressure. When temperature of a battery is in a low cooling range and is higher than temperature in the vehicle cabin, the controller selects the discharge path.

17 Claims, 6 Drawing Sheets

(51) Int. Cl.
*H01M 10/613* (2014.01)
*H01M 10/663* (2014.01)
*H01M 10/48* (2006.01)
*H01M 10/6563* (2014.01)
*H01M 10/63* (2014.01)

(52) U.S. Cl.
CPC ....... *H01M 10/486* (2013.01); *H01M 10/613* (2015.04); *H01M 10/63* (2015.04); *H01M 10/6563* (2015.04); *H01M 10/663* (2015.04); *H01M 2220/20* (2013.01)

(56) References Cited

U.S. PATENT DOCUMENTS

| | | | |
|---|---|---|---|
| 2005/0168180 A1 | 8/2005 | Minekawa et al. | |
| 2009/0071178 A1 | 3/2009 | Major et al. | |

FOREIGN PATENT DOCUMENTS

| | | |
|---|---|---|
| JP | 2004-48981 A | 2/2004 |
| JP | 2008141945 A | 6/2008 |
| JP | 2016005304 A | 1/2016 |
| JP | 2019034650 A | 3/2019 |

* cited by examiner

1

VEHICLE BATTERY COOLING SYSTEM

CROSS-REFERENCE TO RELATED APPLICATIONS

The present application claims priority from Japanese Patent Application No. 2019-056384 filed on Mar. 25, 2019, the entire contents of which are hereby incorporated by reference.

BACKGROUND

The disclosure relates to a vehicle battery cooling system, and in particular, to a vehicle battery cooling system for cooling a battery mounted as a drive source on a vehicle, such as an electric vehicle.

A battery is mounted as a drive source on a vehicle, such as an electric vehicle or a hybrid vehicle. The battery tends to deteriorate in performance and have a reduced service life when the temperature of the battery excessively increases. In view of this, a cooling system for cooling the battery is publicly known. The cooling system introduces air in a vehicle cabin, which is air-conditioned by an air conditioner, to a battery chamber by using a cooling fan to thereby cool the battery.

For example, Japanese Unexamined Patent Application Publication (JP-A) No. 10-306722 discloses a vehicle battery cooling system including a battery as a drive source, a battery temperature sensor, a cooling fan, an air conditioner, a discharge duct, and a circulation duct. The battery temperature sensor measures temperature of the battery. The cooling fan introduces air in a vehicle cabin to a battery chamber that contains the battery. The air conditioner conditions air in the vehicle cabin. The battery chamber and the outside of the vehicle communicate with each other via the discharge duct. The circulation duct circulates air that has passed through the battery chamber such that the air returns to the vehicle cabin.

This cooling system is provided with a switch damper among the battery chamber, the discharge duct, and the circulation duct. The switch damper adjusts an open and close state of each duct. The switch damper is operated to select from among a circulation mode, a discharge mode, and a circulation and discharge mode. The circulation mode is performed to close the discharge duct and circulate air through the circulation duct. The discharge mode is performed to close the circulation duct and discharge air through the discharge duct to the outside of the vehicle. The circulation and discharge mode is performed to adjust an opening degree of each duct and circulate and discharge air by a predetermined ratio. The cooling fan is switched among a high level at which the air blow volume is high, a low level at which the air blow volume is low, and an OFF state, on the basis of temperature of the battery measured by the battery temperature sensor.

This vehicle battery cooling system selects the circulation mode when the cooling fan is in the OFF state. This prevents decrease in efficiency of the air conditioner due to discharge of air in the vehicle cabin to the outside of the vehicle. In the case in which the cooling fan is in the low level, when the air conditioner is in an external air introducing mode, the discharge mode is performed to improve the external air introducing effect of the air conditioner. Otherwise, when the air conditioner is not in the external air introducing mode, the circulation mode is performed to prevent increase in load on the air conditioner due to decrease in the internal pressure of the vehicle cabin, that is, to prevent increase in load on the air conditioner due to entering of external air into the vehicle cabin in response to decrease in the internal pressure. In the case in which the cooling fan is in the high level, the circulation and discharge mode is performed to prevent increase in load on the air conditioner due to decrease in the internal pressure of the vehicle cabin and also to prevent decrease in the air blow volume of the cooling fan.

The vehicle battery cooling system having such a cooling fan cools the battery by use of the air in the vehicle cabin. On the other hand, during driving of the cooling fan, the driving sound is perceived as noise by an occupant, and comfort is reduced.

As a technique of decreasing noise resulted from the cooling fan, JP-A No. 2004-48981 discloses a technique of adjusting a rotational speed of a cooling fan depending on level of noise in a vehicle cabin. A vehicle battery cooling system of this technique controls the operation state of the cooling fan. For example, the rotational speed of the cooling fan is increased, when the vehicle speed is increased, thereby causing large travel noise in the vehicle cabin. In contrast, the rotational speed of the cooling fan is decreased, when the vehicle speed is decreased, thereby causing small travel noise.

SUMMARY

An aspect of the present disclosure provides a vehicle battery cooling system for cooling a battery that serves as a drive source of a vehicle and that is contained in a battery chamber, by supplying air in a vehicle cabin to the battery chamber with a cooling fan. The vehicle battery cooling system includes a battery temperature, a vehicle cabin temperature sensor, a discharge path, a circulation path, a switching unit, and a controller. The battery temperature sensor is configured to measure temperature of the battery. The vehicle cabin temperature sensor is configured to measure temperature in the vehicle cabin. Via the discharge path, the vehicle cabin, the battery chamber, and outside of the vehicle communicate with each other. The circulation path is configured to circulate air between the vehicle cabin and the battery chamber. The switching unit is configured to perform switching between the discharge path and the circulation path. The controller is configured to, when a predetermined pressurization condition is satisfied, operate the switching unit to select either one of the discharge path and the circulation path on a basis of measurement results of the battery temperature sensor and the vehicle cabin temperature sensor. The predetermined pressurization condition includes a condition that an air pressure in the vehicle cabin is higher than atmospheric pressure outside the vehicle. When the temperature of the battery is in a preset low cooling range and is higher than the temperature in the vehicle cabin, the controller selects the discharge path. When the temperature of the battery is in the preset low cooling range and is lower than the temperature in the vehicle cabin, the controller selects the circulation path.

An aspect of the present disclosure provides a vehicle battery cooling system for cooling a battery that serves as a drive source of a vehicle and that is contained in a battery chamber, by supplying air in a vehicle cabin to the battery chamber with a cooling fan. The vehicle battery cooling system includes a battery temperature, a vehicle cabin temperature sensor, a discharge path, a circulation path, a switching unit, and circuitry. The battery temperature sensor is configured to measure temperature of the battery. The vehicle cabin temperature sensor is configured to measure temperature in the vehicle cabin. Via the discharge path, the vehicle cabin, the battery chamber, and outside of the vehicle communicate with each other. The circulation path is configured to circulate air between the vehicle cabin and the battery chamber. The switching unit is configured to perform switching between the discharge path and the circulation path. The circuitry is configured to, when a predetermined pressurization condition is satisfied, operate the switching unit to select either one of the discharge path and the circulation path on a basis of measurement results of the battery temperature sensor and the vehicle cabin temperature sensor. The predetermined pressurization condition includes a condition that an air pressure in the vehicle cabin is higher than atmospheric pressure outside the vehicle. When the temperature of the battery is in a preset low cooling range and is higher than the temperature in the vehicle cabin, the circuitry selects the discharge path. When the temperature of the battery is in the preset low cooling range and is lower than the temperature in the vehicle cabin, the controller selects the circulation path.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the vehicle battery cooling system disclosed in JP-A No. 2004-48981, the driving noise of the cooling fan is mixed with travel noise of the vehicle and other sounds, thereby decreasing noise perceived by an occupant.

Meanwhile, depending on the travel state of the vehicle, the cooling fan is not driven until the battery becomes hot, and the battery is not cooled during that time. After the battery becomes hot, the cooling fan is driven for a long time until the battery is cooled to a desired temperature. As a result, the cooling fan generates noise for a long time.

It is desirable to provide a vehicle battery cooling system with an improved battery cooling performance although making a cooling fan be driven at a low frequency.

Figure 1:
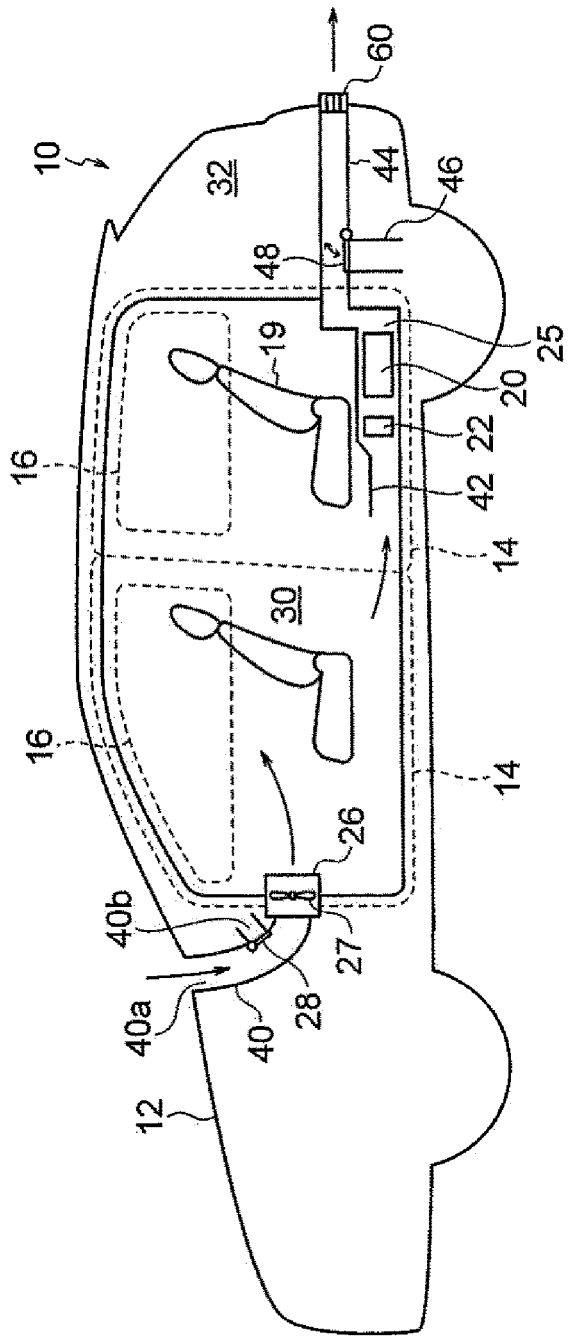
FIG. 1 is a schematic diagram illustrating a vehicle cooling system according to an embodiment of the disclosure.
Figure 2:
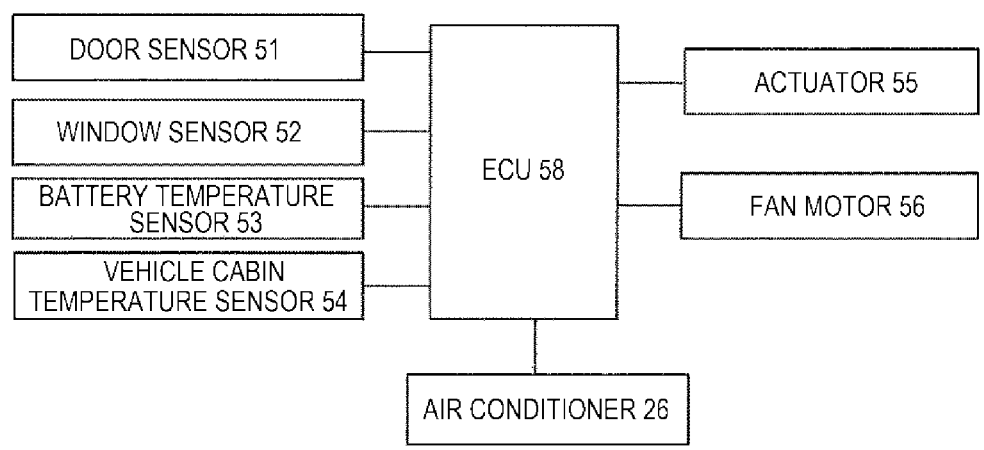
FIG. 2 is a configuration diagram illustrating a control mechanism of the vehicle cooling system.

FIG. 1 is a schematic diagram illustrating a vehicle cooling system according to an embodiment of the disclosure. FIG. 2 is a diagram illustrating a control mechanism of the vehicle cooling system. A vehicle cooling system 10 according to the embodiment of the disclosure is employed in a vehicle 12 that uses a battery 20 as a drive source. In one example, the battery 20 may serve as a "battery". For example, the vehicle 12 may be an electric vehicle, a hybrid vehicle, a plug-in hybrid vehicle, or other vehicle. FIG. 1 illustrates doors 14 and windows 16 of the vehicle 12 by dashed lines and illustrates the interior of a vehicle cabin 30 by solid lines.

As illustrated in FIG. 1, the vehicle cooling system 10 includes the battery 20 mounted on the vehicle 12, a cooling fan 22 for cooling the battery 20, and an air conditioner 26 for conditioning air in the vehicle cabin 30. The vehicle cooling system 10 also includes an air conditioning duct 40, a cooling duct 42, a discharge duct 44, and a circulation duct 46. The air conditioning duct 40 is provided with the air conditioner 26. The vehicle cabin 30 and a battery chamber 25 containing the battery 20 communicate with each other via the cooling duct 42. In one embodiment, the battery chamber 25 may serve as a "battery chamber". The discharge duct 44 constitutes a discharge path. The battery chamber 25 and the outside of the vehicle 12 communicate with each other via the discharge path. The circulation duct 46 constitutes a circulation path that allows air, which is introduced from the vehicle cabin 30 to the battery chamber 25, to return to the vehicle cabin 30.

The air conditioning duct 40 is provided with a first inlet 40a and a second inlet 40b. The first inlet 40a communicates with the outside of the vehicle 12. The second inlet 40b communicates with the vehicle cabin 30. The air conditioner 26 includes a switch damper 28 and a blower fan 27. In one embodiment, the blower fan 27 may serve as a "fan of an air conditioner". The switch damper 28 is provided in the air conditioning duct 40. The blower fan 27 is an air blowing unit and is disposed closer on the vehicle cabin 30 side than the switch damper 28. The switch damper 28 switches an open and close state of each of the first inlet 40a and the second inlet 40b of the air conditioning duct 40. The blower fan 27 is driven by a blower motor, which is not illustrated in the drawing.

When the switch damper 28 closes the first inlet 40a and opens the second inlet 40b while the blower fan 27 is driven, an internal air circulation mode is established. In this mode, the internal air in the vehicle 12 is introduced from the second inlet 40b to an air conditioning part of the air conditioner 26, and this air is blown out from an air outlet of the air conditioner 26 to the vehicle cabin 30. In contrast, when the switch damper 28 opens the first inlet 40a and closes the second inlet 40b while the blower fan 27 is driven, an external air introducing mode is established. In this mode, external air is taken in from the first inlet 40a to the air conditioning duct 40 and is introduced to the air conditioning part, and this air is blown out from the air outlet of the air conditioner 26 to the vehicle cabin 30.

The battery chamber 25 is disposed between the vehicle cabin 30 and a baggage compartment 32 at a rear of the vehicle 12 and in the vicinity of a rear seat 19 that is disposed in the vehicle cabin 30. The battery chamber 25 is disposed under the rear seat 19 in this embodiment. A coupled part between the discharge duct 44 and the circulation duct 46 is provided with a switching valve 48 for switching between the discharge path and the circulation path. In one embodiment, the switching valve 48 may serve as a "switching unit".

As illustrated in FIG. 2, the vehicle cooling system 10 includes a door sensor 51, a window sensor 52, a battery temperature sensor 53, a vehicle cabin temperature sensor 54, an actuator 55 for actuating the switching valve 48, a fan motor 56 for driving the cooling fan 22, and an electronic control unit (ECU) 58 serving as a controller. In one embodiment, the battery temperature sensor 53 may serve as a "battery temperature sensor".

The door sensor 51 detects an open and close state of each door 14 provided to the vehicle 12. The doors 14 include a rear door at the rear of the vehicle 12, such as a rear gate or a tail gate, in addition to the side doors of the vehicle 12. The window sensor 52 detects an open and close state of each windows 16 provided to the vehicle 12. The door sensor 51 and the window sensor 52 may be provided to a window control device or other unit for opening and closing each door 14 and each window 16.

The battery temperature sensor 53 measures temperature Tb of the battery 20, which may also be referred to as a "battery temperature Tb" hereinafter. The battery temperature sensor 53 is provided to either one of the battery 20 and the battery chamber 25. The battery temperature sensor 53 directly or indirectly measures temperature of the battery 20. The vehicle cabin temperature sensor 54 measures temperature Tr in the vehicle cabin 30, which may also be referred to as a "vehicle cabin temperature Tr" hereinafter. The vehicle cabin temperature sensor 54 may be provided to either one of the vehicle cabin 30, the air conditioner 26, the cooling duct 42, and a part between the cooling fan 22 and the battery 20 of the battery chamber 25.

The ECU 58 includes, for example, an information processing unit such as a CPU, a storage unit such as a RAM or a ROM, an input/output interface, and other components. The ECU 58 is communicably coupled to each of the sensors 51, 52, 53, and 54, the actuator 55, the fan motor 56, and the air conditioner 26.

Figure 3:
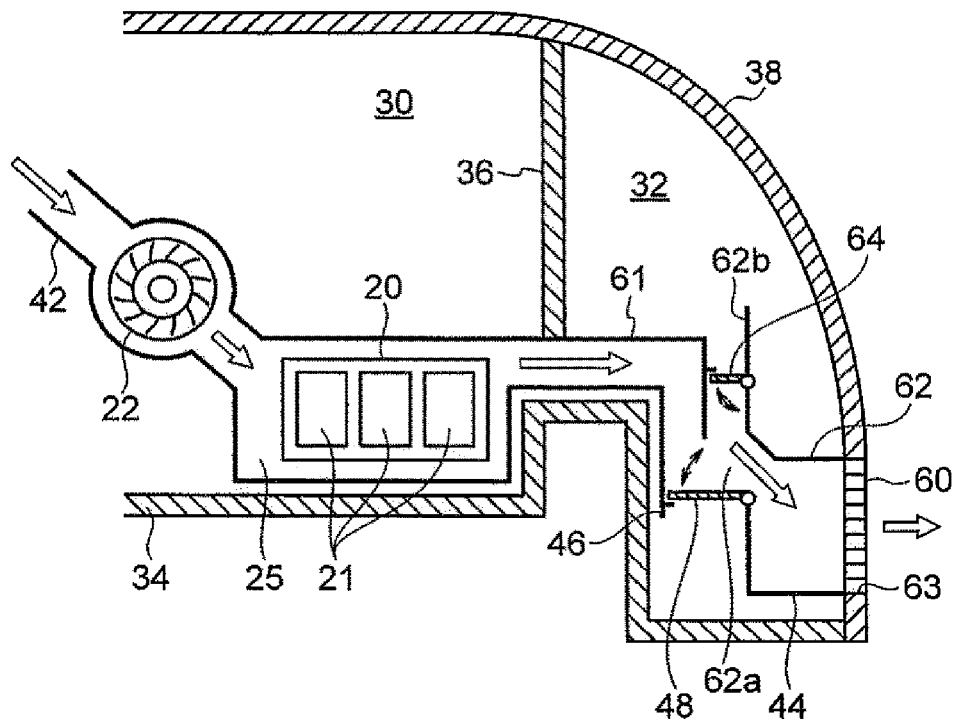
FIG. 3 is a schematic sectional view illustrating a discharge path of the vehicle cooling system.
Figure 4:
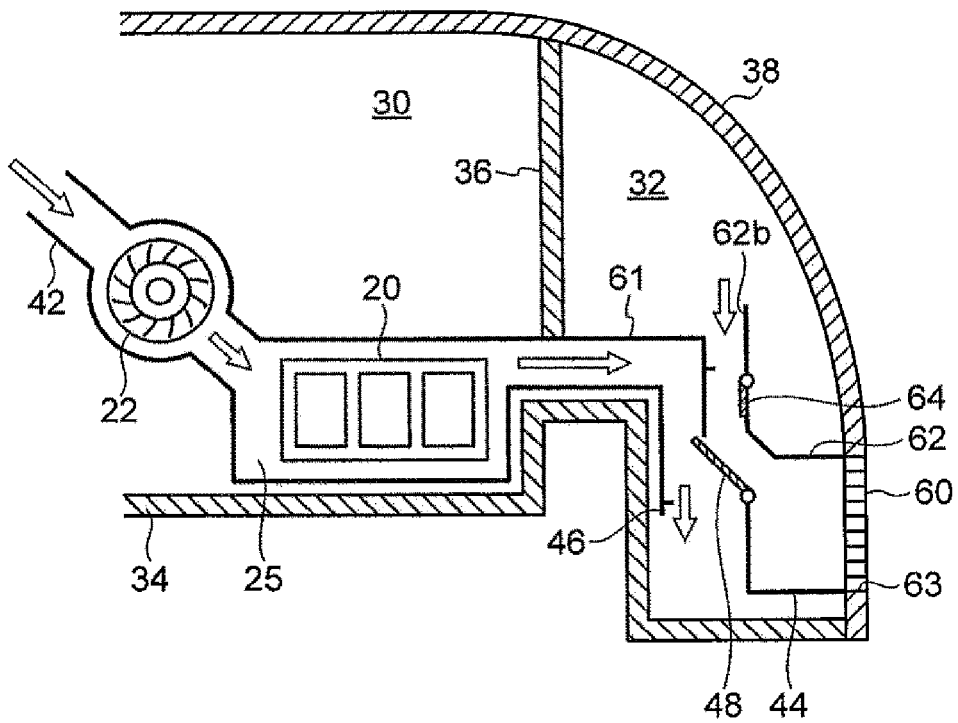
FIG. 4 is a schematic sectional view illustrating a circulation path of the vehicle cooling system.

FIGS. 3 and 4 are sectional views respectively illustrating the discharge path and the circulation path of the vehicle cooling system 10. The vehicle cabin 30 is partitioned by a floor panel 34 that forms a floor surface, an interior trim 36 that forms a side wall, and a roof trim (not illustrated) that forms a top surface, and other parts. The cooling fan 22 is disposed in the cooling duct 42 that couples the vehicle cabin 30 and the battery chamber 25 to each other. The cooling fan 22 is driven by the fan motor 56, which is coupled to the ECU 58, and the cooling fan 22 supplies air in the vehicle cabin 30 to the battery chamber 25. The battery 20 includes plural battery cells 21.

The battery chamber 25 and an opening 63 communicate with each other via the discharge duct 44. The opening 63 is formed in an outer panel 38, which forms a side surface at the rear of the vehicle body. The opening 63 is provided with an air vent grill 60, which opens to discharge air to the outside of the vehicle 12 when the air pressure in the vehicle interior side is high. The circulation duct 46 extends from the battery chamber 25 into the baggage compartment 32.

In this embodiment, a first duct 61 and a second duct 62 are provided. The battery chamber 25 and the baggage compartment 32 communicate each other via the first duct 61. The second duct 62 is disposed between the first duct 61 and the opening 63. The second duct 62 has a first opening 62a and a second opening 62b on one end side and has the other end coupled to the opening 63. The first opening 62a communicates with the first duct 61 via the switching valve 48. The second opening 62b communicates with the baggage compartment 32. The second opening 62b is provided with a check valve 64, which allows air to flow from the second opening 62b into the second duct 62 and prevents a flow in a counter direction of this air.

The switching valve 48 is switched between a discharge position as illustrated in FIG. 3 and a circulation position as illustrated in FIG. 4, by the actuator 55. The switching valve 48 at the discharge position couples a downstream end or an opening at an end on the baggage compartment 32 side of the first duct 61 and the first opening 62a of the second duct 62. This state may be referred to as a "discharge mode" hereinafter. The switching valve 48 at the circulation position releases the downstream end of the first duct 61 and uncouples the first duct 61 from the second duct 62. This state may be referred to as a "circulation mode" hereinafter. In this embodiment, the first and the second ducts 61 and 62 that are coupled via the switching valve 48 constitute the discharge duct 44, and the first duct 61 that is uncoupled from the second duct 62 constitutes the circulation duct 46.

The cooling duct 42 and the discharge duct 44 constitute the discharge path via which the vehicle cabin 30, the battery chamber 25, and the outside of the vehicle 12 communicate with each other. The cooling duct 42 and the circulation duct 46 constitute the circulation path. In more detail, air is discharged from the vehicle cabin 30 to the baggage compartment 32 through the cooling duct 42, the battery chamber 25, and the circulation duct 46 and returns to the vehicle cabin 30 from a gap between the baggage compartment 32 and the vehicle cabin 30, whereby the air circulates. When the air pressure in the baggage compartment 32 becomes higher than the atmospheric pressure outside the vehicle 12, as illustrated in FIG. 4, the second opening 62b is made open, and the air in the baggage compartment 32 is discharged to the outside of the vehicle 12 through the second duct 62.

In the vehicle battery cooling system 10, the ECU 58 controls operations of the actuator 55 and the fan motor 56 on the basis of a detection signal from each of the sensors 51, 52, 53, and 54 and a signal showing an operation state of the air conditioner 26.

A temperature threshold of the battery 20 for switching the switching valve 48 between the discharge mode and the circulation mode is set in the ECU 58. In this embodiment, a low threshold temperature $TH_{LO}$ and a high threshold temperature $TH_{HI}$ are set in a storage of the ECU 58 respectively as a lower limit temperature and an upper limit temperature of a preset low cooling range of the battery 20. In addition, a fan driving threshold temperature $TH_F$ is set in the storage of the ECU 58 as a threshold temperature used as a reference for driving and stopping of the cooling fan 22. The preset low cooling range is a range in which cooling with use of the cooling fan 22 is not necessary or the cooling fan 22 blows air at a small quantity due to relatively low temperature of the battery 20. In other words, the preset low cooling range is a range in which the rotation speed of the cooling fan 22 is lower than a preset high rotation speed.

Figure 5:
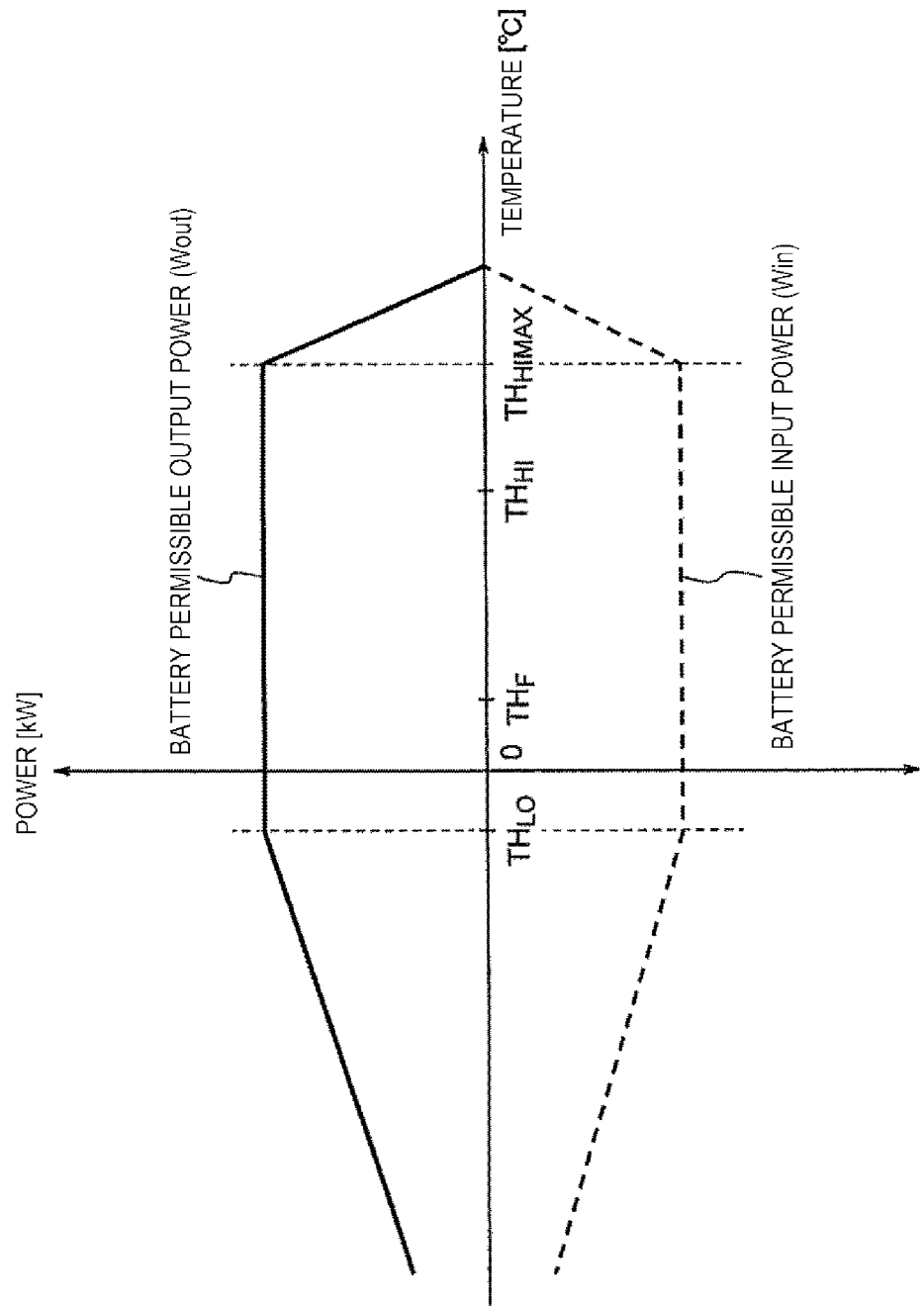
FIG. 5 is a graph illustrating a relationship between a battery temperature and a permissible output power or a permissible input power of the battery.

As illustrated in FIG. 5, the low threshold temperature $TH_{LO}$ and the high threshold temperature $TH_{HI}$ in this embodiment are determined on the basis of a relationship between a permissible output power and a permissible input power of the battery 20, depending on the temperature Tb of the battery 20. The vertical axis in FIG. 5 above zero represents a permissible amount of output power of the battery 20. The vertical axis below zero represents a permissible amount of input power of the battery 20, and the permissible amount increases toward the lower side of the vertical axis. The low threshold temperature $TH_{LO}$ is set at a temperature $TH_{LO}$ that is a lower limit value of a temperature range in which both of the permissible output power and the permissible input power of the battery 20 are approximately constant. The temperature range ranges from the temperature $TH_{LO}$ to a temperature $TH_{HIMP}$ as illustrated in FIG. 5. The high threshold temperature $TH_{HI}$ is set at or smaller than an upper limit value of the temperature range, in which both of the permissible output power and the permissible input power are approximately constant. The upper limit value is at the temperature $TH_{HIMAX}$ in FIG. 5. The magnitude relationship of the threshold temperatures set in the ECU 58 is defined as follows: low threshold temperature $TH_{LO}$<fan driving threshold temperature $TH_F$≤high threshold temperature $TH_{HI}$.

Figure 6:
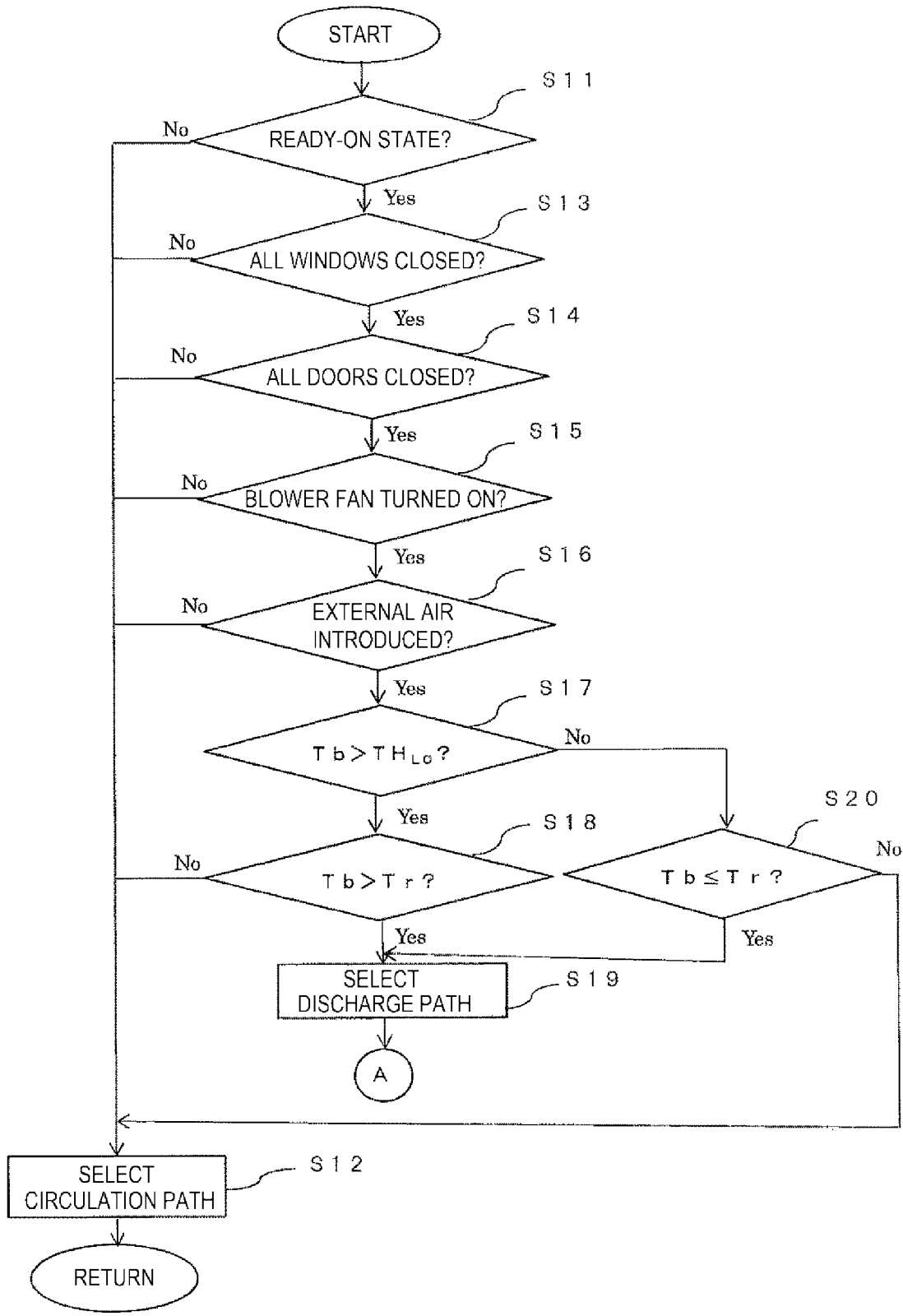
FIG. 6 is a flowchart illustrating a procedure of control performed by an ECU.

Next, a control procedure for selecting between the discharge path and the circulation path by using the ECU 58 will be described with reference to the flowchart in FIG. 6.

The ECU 58 determines whether the vehicle 12 is ready to travel by the drive source, that is, in a ready-on state (step S11). Whether the vehicle 12 is in the ready-on state or in the ready-off state is detected from a state of a power switch that is communicably coupled to the ECU 58, such as an ignition switch. When the vehicle 12 is in the ready-off state (No in step S11), the circulation path is selected (step S12).

When the vehicle 12 is in the ready-on state (Yes in step S11), the ECU 58 determines whether all of the windows 16 of the vehicle 12 are closed, on the basis of a detection signal from the window sensor 52 (step S13). When not all of the windows 16 are closed (No in step S13), the circulation path is selected (step S12), and the control process returns.

When all of the windows 16 are closed (Yes in step S13), the ECU 58 determines whether all of the doors 14 of the vehicle 12 are closed, on the basis of a detection signal from the door sensor 51 (step S14). When not all of the doors 14 are closed (No in step S14), the circulation path is selected (step S12), and the control process returns.

When all of the doors 14 are closed (Yes in step S14), the ECU 58 determines whether the blower fan 27 of the air conditioner 26 is in an ON state, on the basis of a signal from the air conditioner 26 (step S15). When the blower fan 27 is in an OFF state (No in step S15), the circulation path is selected (step S12), and the control process returns.

When the blower fan 27 is in the ON state (Yes in step S15), the ECU 58 determines whether the air conditioner 26 is in the external air introducing mode, on the basis of a signal from the air conditioner 26 (step S16). When the air conditioner 26 is not in the external air introducing mode (No in step S16), the circulation path is selected (step S12), and the control process returns.

The steps S13, S14, S15, and S16 uses conditions for determining that the air pressure in the vehicle cabin 30 is pressurized to be higher than the atmospheric pressure outside the vehicle 12. In one embodiment, these conditions may serve as "predetermined pressurization conditions". The ECU 58 determines that the vehicle cabin 30 is pressurized, when all of these conditions are satisfied.

When the air conditioner 26 is determined as being in the external air introducing mode in step S16 (Yes in step S16), the ECU 58 determines whether the battery temperature Tb is higher than the low threshold temperature $TH_{LO}$, on the basis of a measurement result of the battery temperature sensor 53 (step S17).

When the battery temperature Tb is higher than the low threshold temperature $TH_{LO}$ (Yes in step S17), the ECU 58 further determines whether the battery temperature Tb is higher than the vehicle cabin temperature Tr, on the basis of a measurement result of the vehicle cabin temperature sensor 54 (step S18).

When the battery temperature Tb is higher than the vehicle cabin temperature Tr (Yes in step S18), the ECU 58 drives the actuator 55 to actuate the switching valve 48, thereby selecting the discharge path (step S19).

On the other hand, when the battery temperature Tb is equal to or lower than the vehicle cabin temperature Tr (No in step S18), the ECU 58 selects the circulation path (step S12) and returns the control process.

When the battery temperature Tb is equal to or lower than the low threshold temperature $TH_{LO}$ in step S17 (No in step S17), the ECU 58 further determines whether the battery temperature Tb is equal to or lower than the vehicle cabin temperature Tr, on the basis of a measurement result of the vehicle cabin temperature sensor 54 (step S20).

When the battery temperature Tb is equal to or lower than the vehicle cabin temperature Tr (Yes in step S20), the ECU 58 drives the actuator 55 to actuate the switching valve 48, thereby selecting the discharge path (step S19).

On the other hand, when the battery temperature Tb is higher than the vehicle cabin temperature Tr (No in step S20), the ECU 58 selects the circulation path (step S12) and returns the control process.

Figure 7:
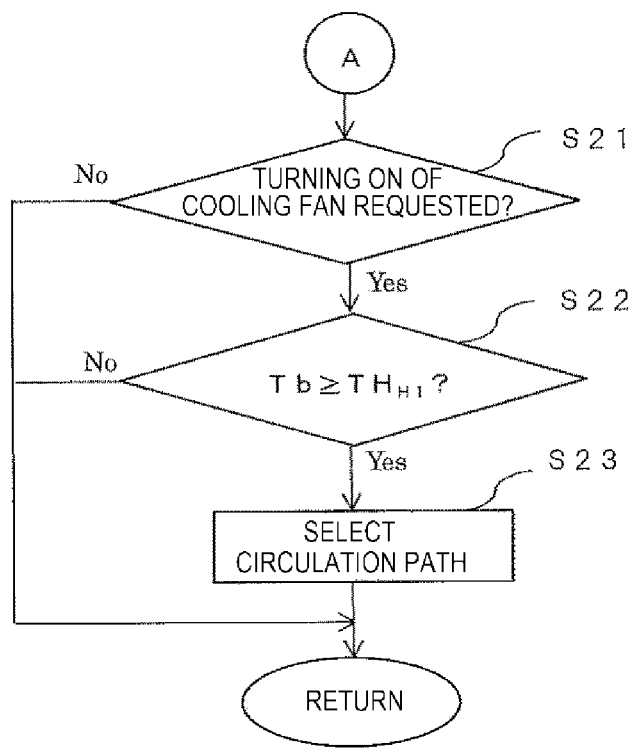
FIG. 7 is a flowchart illustrating a procedure of control performed by the ECU.

After selecting the discharge path in step S19, the ECU 58 further performs a control procedure illustrated in the flowchart in FIG. 7. That is, in the state in which the discharge path is selected, whether driving of the cooling fan 22 is requested is determined (step S21). The driving and stopping of the cooling fan 22 is performed on the basis of map information showing a relationship between the battery temperature Tb and the rotation speed of the cooling fan 22. The map information is set in the storage of the ECU 58 in advance.

Figure 8:
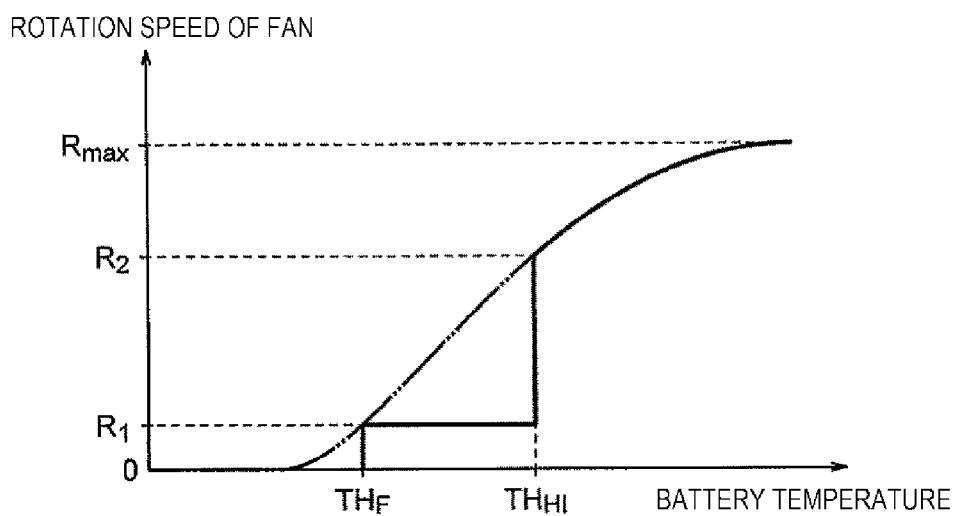
FIG. 8 is a graph illustrating a relationship between a battery temperature and a rotation speed of a cooling fan.

FIG. 8 is a graph illustrating an example of the map information showing a relationship between the battery temperature Tb and the rotation speed of the cooling fan 22. In this embodiment, when the battery temperature Tb satisfies the relationship: fan driving threshold temperature $TH_F$≤battery temperature Tb<high threshold temperature $TH_{HI}$, the ECU 58 operates the fan motor 56 to rotationally drive the cooling fan 22 at a preset constant rotation speed or a constant low rotation speed $R_1$. The cooling fan 22 is set as follows. That is, when the battery temperature Tb rises to the high threshold temperature $TH_{HI}$, the cooling fan 22 is rotationally driven at a rotation speed $R_2$ that is higher than the rotation speed $R_1$. Thereafter, as the battery temperature Tb rises, the rotation speed of the cooling fan 22 is increased to the maximum rotation speed $R_{MAX}$. As illustrated by a two-dot chain line in FIG. 8, the rotation speed of the cooling fan 22 may be set so as to gradually increase from zero.

In this embodiment, it is determined that the driving of the cooling fan 22 is requested when the battery temperature Tb is equal to or higher than the fan driving threshold temperature $TH_F$ (Yes in step S21). The cooling fan 22 may be set so as to be driven when the battery temperature Tb is equal to or higher than the high threshold temperature $TH_{HI}$ and so as to stop when the battery temperature Tb is lower than the high threshold temperature $TH_{HI}$. In this condition, it is determined that the driving of the cooling fan 22 is requested when the battery temperature Tb is equal to or higher than the high threshold temperature $TH_{HI}$.

When the determination is Yes in step S21, the ECU 58 further determines whether the battery temperature Tb is equal to or higher than the high threshold temperature $TH_{HI}$ (step S22). When the battery temperature Tb is equal to or higher than the high threshold temperature $TH_{HI}$ (Yes in step S22), the ECU 58 drives the actuator 55 to actuate the switching valve 48, thereby selecting the circulation path (step S23). Thereafter, the ECU 58 returns the control process.

When the driving of the cooling fan 22 is not requested (No in step S21) or when the battery temperature Tb is lower than the high threshold temperature $TH_{HI}$ (No in step S22), the control process returns while the state of selecting the discharge path is maintained.

In the state in which the battery temperature Tb satisfies the relationship: low threshold temperature $TH_{LO}$<battery temperature Tb<high threshold temperature $TH_{HI}$, that is, in the state in which the temperature Tb is relatively low, the air pressure in the vehicle cabin 30 may be pressurized to be higher than the atmospheric pressure outside the vehicle 12. In these conditions, the vehicle battery cooling system 10 selects between the discharge path and the circulation path by comparing the temperature of the battery and the temperature in the vehicle cabin 30. This increases the cooling performance for the battery 20 while reducing the frequency of driving of the cooling fan 22.

In details, when the battery temperature Tb is higher than the vehicle cabin temperature Tr, the discharge path is selected to discharge pressurized air in the vehicle cabin 30 to the outside of the vehicle 12 through the battery chamber 25. Thus, the battery 20 is cooled by the low-temperature air in the vehicle cabin 30 without driving the cooling fan 22. The ECU 58 checks that the vehicle cabin 30 satisfies the predetermined pressurization conditions, before selecting the discharge path. Thus, air in the vehicle cabin 30 is appropriately made to flow into the battery chamber 25. When the battery temperature Tb is lower than the vehicle cabin temperature Tr, the circulation path is selected to suppress warm air in the vehicle cabin 30 flowing into the battery chamber 25, whereby increase in temperature of the battery 20 is suppressed.

When the battery temperature Tb is increased to a high temperature that is equal to or higher than the high threshold temperature $TH_{HI}$, the circulation path is selected, and the cooling fan 22 is driven, to reduce load on the cooling fan 22. In more detail, when the cooling fan 22 is driven with the discharge path selected, air that is taken from the outside of the vehicle 12 into the vehicle cabin 30 through the air conditioning duct 40 is supplied to the battery chamber 25. When the cooling fan 22 is driven with the circulation path selected, air is circulated between the vehicle cabin 30 and the battery chamber 25. Thus, the same volume of air is supplied to the battery chamber 25 by a smaller suction force in the case of selecting the circulation path, compared with the case of selecting the discharge path. When the battery 20 is in a high temperature region in which the battery temperature Tb is equal to or higher than the high threshold temperature $TH_{HI}$, the priority of cooling of the battery 20 is especially higher than the priority of operation considering noise of the cooling fan 22. However, selecting the circulation path when the battery 20 is in the high temperature region enables supplying a great volume of air to the battery chamber 25 while decreasing the rotation speed of the cooling fan 22. Thus, the cooling performance for the battery 20 is improved while noise of the cooling fan 22 is reduced.

When the battery 20 is in a low temperature region in which the battery temperature Tb is equal to or lower than the low threshold temperature $TH_{LO}$, the performance of the battery 20 can be improved by warming up the battery 20. In this embodiment, the discharge path is selected when the battery temperature Tb is lower than the vehicle cabin temperature Tr and the battery 20 is in the low temperature region, and the vehicle cabin 30 is pressurized. This allows warm air in the vehicle cabin 30 to flow into the battery chamber 25 to warm up the battery 20, thereby improving the performance of the battery. When the battery temperature Tb is higher than the vehicle cabin temperature Tr, the circulation path is selected, thereby preventing the battery 20 from being cooled by air in the vehicle cabin 30.

It is noted here that the embodiment of the disclosure is not limited to the forgoing embodiments and various modifications and alterations can be made thereto within the gist of the disclosure.

For example, the high threshold temperature $TH_{HI}$, which is the upper limit value of the preset low cooling range of the battery 20, may be a variable value that is determined on the basis of a rising rate of the battery temperature Tb and map information. The rising rate is obtained from a measurement result of the battery temperature sensor 53. This map information is stored in the ECU 58 and shows a relationship between the high threshold temperature $TH_{HI}$ and the rising rate of the battery temperature Tb. This map information is set as desired. In one embodiment, a reference rising rate of the battery temperature Tb and a reference high threshold temperature may be set. In these conditions, the map information may be set so that the high threshold temperature $TH_{HI}$ becomes lower than the reference high threshold temperature when the rising rate of the battery temperature Tb, which is measured by the battery temperature sensor 53, is higher than the reference rising rate. Similarly, the map information may also be set so that the high threshold temperature $TH_{HI}$ becomes higher than the reference high threshold temperature when the rising rate of the battery temperature Tb is lower than the reference rising rate. An appropriate high threshold temperature $TH_{HI}$ may be thus set in accordance with the rising rate of the battery temperature Tb. This enables more efficiently cooling the battery 20 and preventing the driving time of the cooling fan 22 from being long.

According to the embodiment of the disclosure, when the air pressure in the vehicle cabin is pressurized to be higher than the atmospheric pressure outside the vehicle in the state in which the temperature of the battery is in the preset low cooling range, that is, the temperature of the battery is relatively low, the temperature of the battery and the temperature in the vehicle cabin are compared with each other, and switching is performed between the discharge path and the circulation path. This makes air in the vehicle cabin cool the battery without driving the cooling fan.

In details, when the battery temperature is higher than the vehicle cabin temperature, the discharge path is selected to discharge pressurized air in the vehicle cabin to the outside of the vehicle through the battery chamber. Thus, the battery is cooled by the vehicle cabin air with a temperature lower than the battery temperature, without driving the cooling fan. When the battery temperature is lower than the vehicle cabin temperature, the circulation path is selected to suppress warm air in the vehicle cabin flowing into the battery chamber, whereby increase in temperature of the battery is suppressed. These functions improve the cooling performance for the battery while decreasing the driving frequency of the cooling fan.

The discharge path is selected by appropriately determining the pressurized state of the vehicle cabin, whereby air in the vehicle cabin is discharged to the outside of the vehicle.

When the battery temperature is increased to a high temperature that is equal to or higher than the upper limit value of the preset low cooling range, the circulation path is selected, and the cooling fan is driven, to reduce load on the cooling fan. In more detail, in driving the cooling fan, the discharge path supplies air that is taken from the outside of the vehicle into the vehicle cabin through an air duct of the air conditioner to the battery chamber, whereas the circulation path circulates air between the vehicle cabin and the battery chamber. Thus, the same volume of air is supplied to the battery chamber by a smaller suction force in the case of selecting the circulation path, compared with the case of selecting the discharge path. That is, selecting the circulation path in supplying a great volume of air to the battery chamber by use of the cooling fan decreases the rotation speed of the cooling fan and reduces noise.

An appropriate high threshold temperature is set in accordance with the rising rate of the battery temperature. This enables efficiently cooling the battery and preventing the driving time of the cooling fan from being long.

In the state in which the battery temperature is in the preset low cooling range and is relatively low, the battery temperature is cooled while noise due to the cooling fan is reduced. On the other hand, when the battery temperature is high, the battery is sufficiently cooled by making the cooling fan blow a great amount of air.

As described above, the vehicle cooling system according to the embodiment of the disclosure has an improved battery cooling performance although making a cooling fan be driven at a low frequency.

The invention claimed is:

1. A vehicle battery cooling system for cooling a battery that serves as a drive source of a vehicle and that is contained in a battery chamber, by supplying air in a vehicle cabin to the battery chamber with a cooling fan, the vehicle battery cooling system comprising:
   a battery temperature sensor configured to measure temperature of the battery;
   a vehicle cabin temperature sensor configured to measure temperature in the vehicle cabin;
   a discharge path via which the vehicle cabin, the battery chamber, and outside of the vehicle communicate with each other;
   a circulation path configured to circulate air between the vehicle cabin and the battery chamber;
   a switching valve configured to perform switching between the discharge path and the circulation path; and
   a controller configured to, when a predetermined pressurization condition is satisfied, operate the switching valve to select either one of the discharge path and the circulation path on a basis of measurement results of the battery temperature sensor and the vehicle cabin temperature sensor, the predetermined pressurization condition including a condition that an air pressure in the vehicle cabin is higher than atmospheric pressure outside the vehicle, wherein when the temperature of the battery is in a preset low cooling range and is higher than the temperature in the vehicle cabin, the controller selects the discharge path, and
   when the temperature of the battery is in the preset low cooling range and is lower than the temperature in the vehicle cabin, the controller selects the circulation path.

2. The vehicle battery cooling system according to claim 1, wherein the predetermined pressurization condition includes conditions that (i) all windows and all doors of the vehicle are closed, (ii) a fan of an air conditioner configured to condition the air in the vehicle cabin is turned on, and (iii) the air conditioner is in an external air introducing mode.

3. The vehicle battery cooling system according to claim 1, wherein when the predetermined pressurization condition is satisfied and the temperature of the battery is equal to or higher than an upper limit value of the preset low cooling range, the controller selects the circulation path and drives the cooling fan.

4. The vehicle battery cooling system according to claim 2, wherein when the predetermined pressurization condition is satisfied and the temperature of the battery is equal to or higher than an upper limit value of the preset low cooling range, the controller selects the circulation path and drives the cooling fan.

5. The vehicle battery cooling system according to claim 1, wherein
   a high threshold temperature that is an upper limit value of the preset low cooling range is a variable value determined on a basis of a rising rate of the temperature of the battery and map information,
   the rising rate is obtained from the measurement result of the battery temperature sensor, and
   the map information is stored in the controller and indicates a relationship between the high threshold temperature and the rising rate of the temperature of the battery.

6. The vehicle battery cooling system according to claim 2, wherein
   a high threshold temperature that is an upper limit value of the preset cooling range is a variable value determined on a basis of a rising rate of the temperature of the battery and map information,
   the rising rate is obtained from the measurement result of the battery temperature sensor, and
   the map information is stored in the controller and indicates a relationship between the high threshold temperature and the rising rate of the temperature of the battery.

7. The vehicle battery cooling system according to claim 3, wherein
   a high threshold temperature that is the upper limit value of the preset cooling range is a variable value determined on a basis of a rising rate of the temperature of the battery and map information,
   the rising rate is obtained from the measurement result of the battery temperature sensor, and
   the map information is stored in the controller and indicates a relationship between the high threshold temperature and the rising rate of the temperature of the battery.

8. The vehicle battery cooling system according to claim 4, wherein
   a high threshold temperature that is the upper limit value of the preset cooling range is a variable value determined on a basis of a rising rate of the temperature of the battery and map information,
   the rising rate is obtained from the measurement result of the battery temperature sensor, and the map information is stored in the controller and indicates a relationship between the high threshold temperature and the rising rate of the temperature of the battery.

9. The vehicle battery cooling system according to claim 1, wherein
when the temperature of the battery is in the preset low cooling range, the controller stops the cooling fan or drives the cooling fan at a preset constant rotation speed, and
when the temperature of the battery is equal to or higher than an upper limit value of the preset low cooling range, the controller drives the cooling fan at a rotation speed higher than the preset constant rotation speed.

10. The vehicle battery cooling system according to claim 2, wherein
when the temperature of the battery is in the preset low cooling range, the controller stops the cooling fan or drives the cooling fan at a preset constant rotation speed, and
when the temperature of the battery is equal to or higher than an upper limit value of the preset low cooling range, the controller drives the cooling fan at a rotation speed higher than the preset constant rotation speed.

11. The vehicle battery cooling system according to claim 3, wherein
when the temperature of the battery is in the preset low cooling range, the controller stops the cooling fan or drives the cooling fan at a preset constant rotation speed, and
when the temperature of the battery is equal to or higher than the upper limit value of the preset low cooling range, the controller drives the cooling fan at a rotation speed higher than the preset constant rotation speed.

12. The vehicle battery cooling system according to claim 4, wherein
when the temperature of the battery is in the preset low cooling range, the controller stops the cooling fan or drives the cooling fan at a preset constant rotation speed, and
when the temperature of the battery is equal to or higher than the upper limit value of the preset low cooling range, the controller drives the cooling fan at a rotation speed higher than the preset constant rotation speed.

13. The vehicle battery cooling system according to claim 5, wherein
when the temperature of the battery is in the preset low cooling range, the controller stops the cooling fan or drives the cooling fan at a preset constant rotation speed, and
when the temperature of the battery is equal to or higher than the upper limit value of the preset low cooling range, the controller drives the cooling fan at a rotation speed higher than the preset constant rotation speed.

14. The vehicle battery cooling system according to claim 6, wherein
when the temperature of the battery is in the preset low cooling range, the controller stops the cooling fan or drives the cooling fan at a preset constant rotation speed, and
when the temperature of the battery is equal to or higher than the upper limit value of the preset low cooling range, the controller drives the cooling fan at a rotation speed higher than the preset constant rotation speed.

15. The vehicle battery cooling system according to claim 7, wherein
when the temperature of the battery is in the preset low cooling range, the controller stops the cooling fan or drives the cooling fan at a preset constant rotation speed, and
when the temperature of the battery is equal to or higher than the upper limit value of the preset low cooling range, the controller drives the cooling fan at a rotation speed higher than the preset constant rotation speed.

16. The vehicle battery cooling system according to claim 8, wherein
when the temperature of the battery is in the preset low cooling range, the controller stops the cooling fan or drives the cooling fan at a preset constant rotation speed, and
when the temperature of the battery is equal to or higher than the upper limit value of the preset low cooling range, the controller drives the cooling fan at a rotation speed higher than the preset constant rotation speed.

17. A vehicle battery cooling system configured to cool a battery that serves as a drive source of a vehicle and that is contained in a battery chamber, by supplying air in a vehicle cabin to the battery chamber with a cooling fan, the vehicle battery cooling system comprising:
a battery temperature sensor configured to measure temperature of the battery;
a vehicle cabin temperature sensor configured to measure temperature in the vehicle cabin;
a discharge path via which the vehicle cabin, the battery chamber, and outside of the vehicle communicate with each other;
a circulation path configured to circulate air between the vehicle cabin and the battery chamber;
a switching valve configured to perform switching between the discharge path and the circulation path; and
circuitry configured to, when a predetermined pressurization condition is satisfied, operate the switching valve to select either one of the discharge path and the circulation path on a basis of measurement results of the battery temperature sensor and the vehicle cabin temperature sensor, the predetermined pressurization condition including a condition that an air pressure in the vehicle cabin is higher than atmospheric pressure outside the vehicle, wherein
when the temperature of the battery is in a preset low cooling range and is higher than the temperature in the vehicle cabin, the circuitry selects the discharge path, and
when the temperature of the battery is in the preset low cooling range and is lower than the temperature in the vehicle cabin, the circuitry selects the circulation path.

* * * * *